United States Patent
Kauschke et al.

(10) Patent No.: US 8,351,450 B2
(45) Date of Patent: Jan. 8, 2013

(54) INFORMATION TRANSPARENT ADAPTATION FUNCTION FOR PACKET BASED NETWORK CONNECTIONS

(75) Inventors: Michael Kauschke, Braunschweig (DE); Michael Riepen, Braunschweig (DE); Heiko Woelk, Uelzen (DE)

(73) Assignee: Intel Corporation, Santa Clara, CA (US)

( * ) Notice: Subject to any disclaimer, the term of this patent is extended or adjusted under 35 U.S.C. 154(b) by 1734 days.

(21) Appl. No.: 11/323,694

(22) Filed: Dec. 30, 2005

(65) Prior Publication Data

US 2007/0153831 A1 Jul. 5, 2007

(51) Int. Cl.
*H04L 12/54* (2006.01)
(52) U.S. Cl. .......................... 370/428; 370/535
(58) Field of Classification Search .................. 370/474, 370/428, 535
See application file for complete search history.

(56) References Cited

U.S. PATENT DOCUMENTS

| | | | |
|---|---|---|---|
| 6,289,066 B1 * | 9/2001 | LaVigne et al. | 375/372 |
| 6,330,245 B1 * | 12/2001 | Brewer et al. | 370/424 |
| 6,891,845 B2 * | 5/2005 | Boock et al. | 370/412 |
| 7,343,425 B1 * | 3/2008 | Lo et al. | 709/246 |
| 7,366,803 B1 * | 4/2008 | Gaither et al. | 710/54 |
| 7,519,728 B1 * | 4/2009 | Yeluri et al. | 709/234 |
| 7,729,389 B1 * | 6/2010 | Lo | 370/535 |
| 2001/0014104 A1 * | 8/2001 | Bottorff et al. | 370/471 |
| 2003/0002516 A1 * | 1/2003 | Boock et al. | 370/412 |
| 2006/0277346 A1 * | 12/2006 | Doak et al. | 710/305 |
| 2011/0211827 A1 * | 9/2011 | Soto et al. | 398/25 |

* cited by examiner

*Primary Examiner* — Sai-Ming Chan
(74) *Attorney, Agent, or Firm* — Caven & Aghevli LLC (57) ABSTRACT

In one embodiment, a rate adaptation device comprises one or more input/output (I/O) ports coupled to a first network operating at a first data transmission rate, a first physical coding sublayer (PCS) receiver to receive a stream of PCS blocks from the first network, an idle symbol remover to remove a sequence of idle symbols from the first PCS block and combine the one or more non-idle PCS symbols in a buffer with one or more non-idle PCS symbols from a second PCS block to form a third PCS block, and a PCS transmitter to transmit the third PCS block to a second network operating at a second data transmission rate.

19 Claims, 7 Drawing Sheets

INFORMATION TRANSPARENT ADAPTATION FUNCTION FOR PACKET BASED NETWORK CONNECTIONS

BACKGROUND

The subject matter described herein relates generally to the field of electronic communication and more particularly to an information transparent adaptation function for packet based network connections.

Local area networks (LANs) have allowed enterprises to operate data communication networks enabling devices such as personal computers, printers, data servers and the like to exchange data over a locally maintained transmission medium. Data links to couple these devices in a LAN typically transmit data between devices according any one of several Ethernet protocols.

Wide area networks (WANs) have enabled enterprises to couple LANs at different geographical sites to communicate through one or more high-speed data links. Such high-speed data links may be provided by a data communication service provider such as a telecommunication service provider. These high speed data links are typically part of a network backbone and formed according to a protocol such as, e.g., the "Synchronous Optical NETwork" (SONET) protocol, the "Synchronous Digital Hierarchy" (SDH) protocol, or the "Optical Transport Network" (OTN) protocol.

Transmitting data between LANs, SONET, SDH, or OTN links may involve encapsulating Ethernet frames for transmission between access ports on respective LANs. For example, an access port on a LAN may be adapted to transmit and receive data frames at a data rate of approximately 10.3 gigabits per second according to a 10 Gigabit Ethernet standard as provided in IEEE Std. 802.3ae, published June, 2002. The access port may then be coupled to a SONET link provisioned to provide data rate of about OC-192 capable of transmitting the encapsulated data frames at a data rate of about 9.5 gigabits per second. This transmission rate mismatch may pose issues when communicating between these links.

BRIEF DESCRIPTION OF THE DRAWINGS

The detailed description is described with reference to the accompanying figures.

DETAILED DESCRIPTION

Described herein are exemplary systems and methods for rate adaptation in a communication system. In the following description, numerous specific details are set forth in order to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

Figure 1:
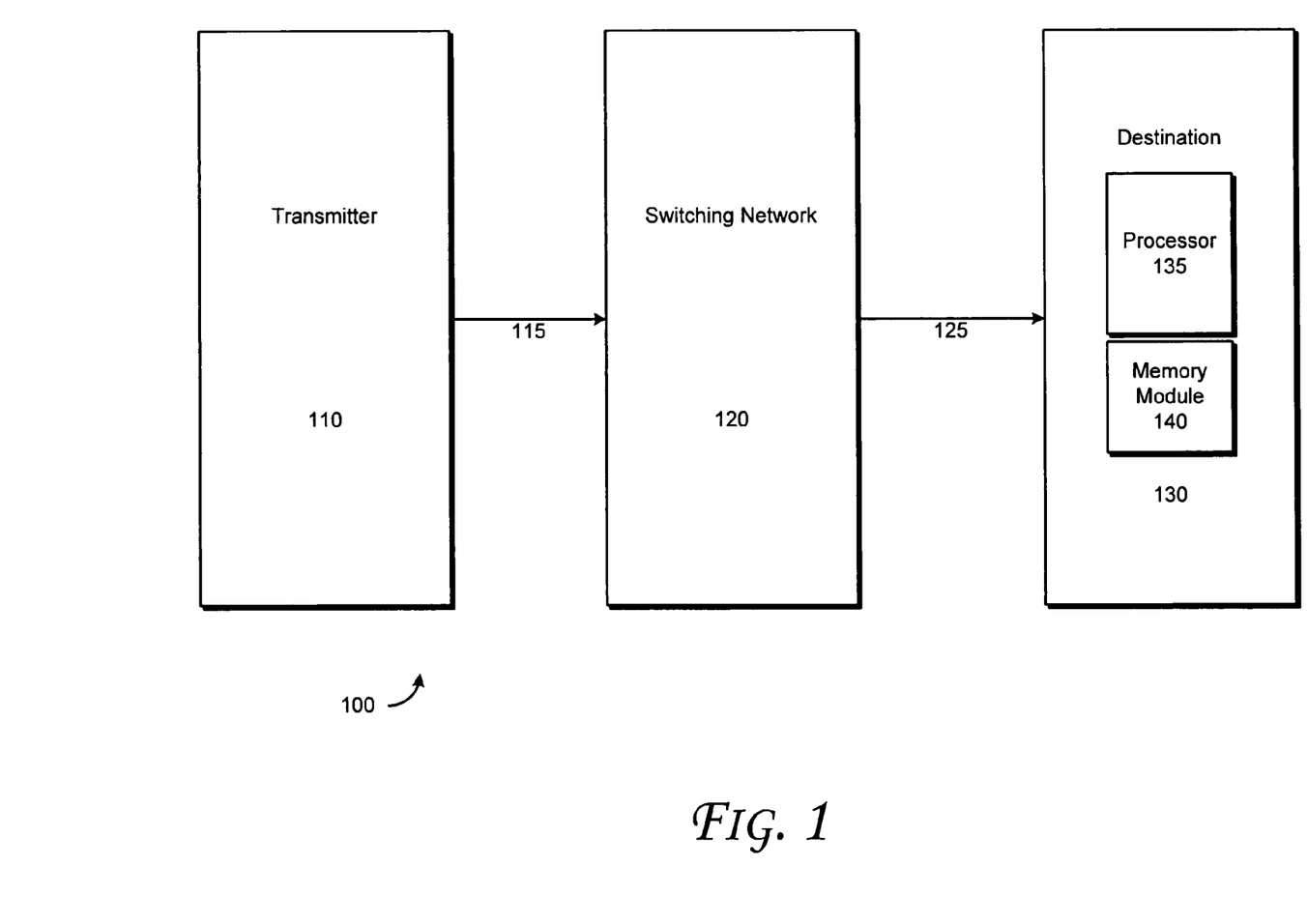
FIG. 1 is a schematic illustration of a communication network in accordance with one embodiment.

FIG. 1 is a schematic illustration of a communication system in accordance with one embodiment. Referring to FIG. 1A, communication system 100 includes a transmitter 110 coupled through a communication pathway 115 to a switching network 120. Switching network 120 is coupled through a communication pathway 125 to a destination 130.

Transmitter 110 transmits data as a series of payloads/frames to the destination 130 through the switching network 120. Packets may pass through a variety of hardware and/or software components, such as servers, routers, switches, etc. in transmission across switching network 120. As each frame arrives at a hardware and/or software component, the component may store the frame briefly before transmitting the frame to the next component. The frames proceed through the network until they arrive at the destination 130. The destination 130 may contain one or more processors 135 and/or one or more memory modules 140.

Figure 2:
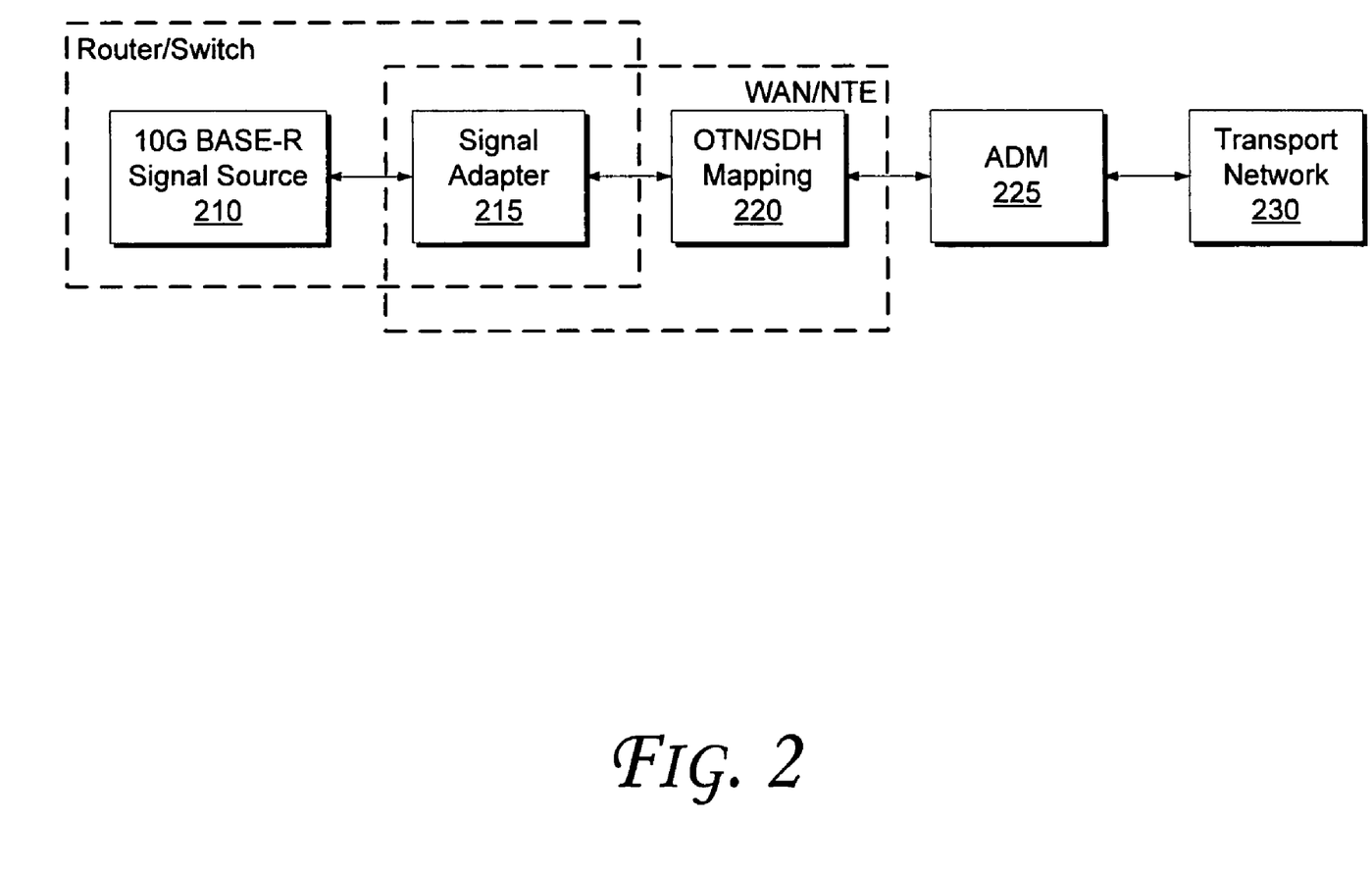
FIG. 2 is a schematic illustration of an architecture to implement an information transparent adaptation function for packet based network connections in accordance with one embodiment.

FIG. 2 is a schematic illustration of an architecture to implement an information transparent adaptation function for packet based network connections in accordance with one embodiment. Referring to FIG. 2, a signal source 210 generates a 10 GE (gigabyte Ethernet) signal. In one embodiment, signal source 210 may be a router or a switching device coupled to a local area network (LAN). Signal source 210 may include one or more input/output (I/O) ports, from which a 10 GE signal may be transceived.

A signal adapter 215 is coupled to the communication path associated with the one or more (I/O) ports. In one embodiment, signal adapter 215 adapts the 10 GE signal from signal source 210 into payload container of the transport standard (e.g., ODUk, or C4-Xc) implemented by transport network 230.

A mapping module 220 may map the payload into a transport structure suitable for transmission across transport network 230. In one embodiment mapping module 220 may comprise a framer to assemble data streams into frame structures such as, e.g., SONET or SDH frame structures. An add/drop multiplexer (ADM) 225 may be used to multiplex the transport structures onto transport network 230.

In one embodiment, transport network 230 may be compatible with SONET/SDH as well as other protocols such as OTN, and ATM, although other standards may be used. For example, SONET/SDH and OTN are described in: ITU-T Recommendation G.709 Interfaces for the optical transport network (OTN) (2001); ANSI T1.105, Synchronous Optical Network (SONET) Basic Description Including Multiplex Structures, Rates, and Formats; Bellcore Generic Requirements, GR-253-CORE, Synchronous Optical Network (SONET) Transport Systems: Common Generic Criteria (A Module of TSGR, FR-440), Issue 1, December 1994; ITU Recommendation G.872, Architecture of Optical Transport Networks, 1999; ITU Recommendation G.825, "Control of Jitter and Wander within Digital Networks Based on SDH" March, 1993; ITU Recommendation G.957, "Optical Interfaces for Equipment and Systems Relating to SDH", July, 1995; ITU Recommendation G.958, Digital Line Systems based on SDH for use on Optical Fibre Cables, November, 1994; and/or ITU-T Recommendation G.707, Network Node Interface for the Synchronous Digital Hierarchy (SDH) (1996).

Figure 3:
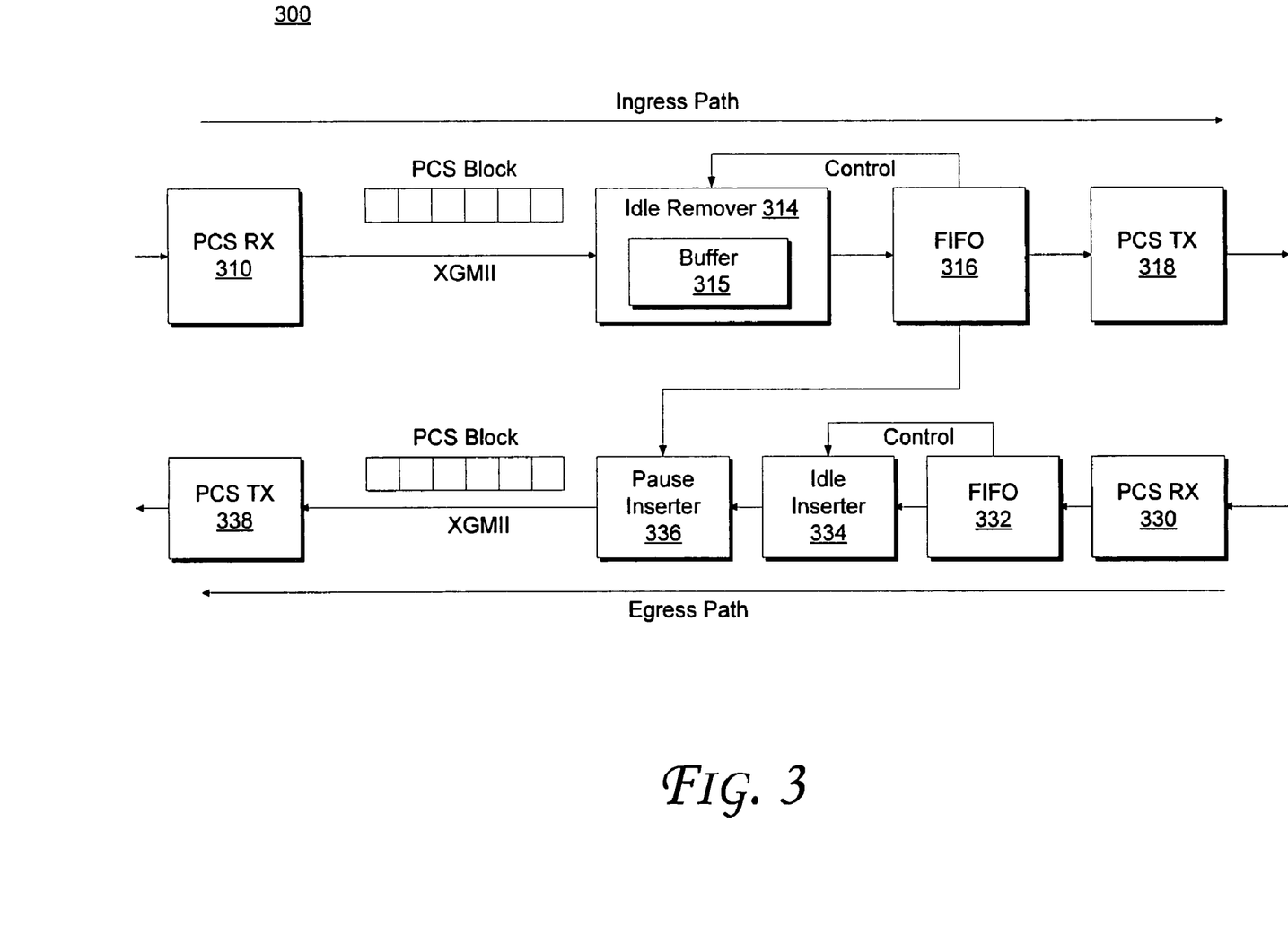
FIG. 3 is a schematic illustration of a rate adaptation device in accordance with one embodiment.

FIG. 3 is a schematic illustration of a rate adaptation device 300 in accordance with one embodiment. In one embodiment, the rate adaptation device 300 may be incorporated into signal adapter 215, e.g., in a router and/or switch, as illustrated in FIG. 2. For example, the rate adaptation device 300 may be embodied in logic on an integrated circuit on e.g., an I/O card or the like. In an alternate embodiment the signal adapter 215 may be combined with the OTN/SDH mapping module 220, e.g., on a router uplink card.

Referring to FIG. 3, rate adaptation device 300 comprises an ingress path having a physical coding sublayer (PCS) receiver 310 that receives PCS blocks. An idle remover 314 coupled to the PCS receiver via, e.g., an XMGII interface, comprises a memory buffer 315. A first-in-first-out (FIFO) memory module 316 is coupled to idle remover 314 and to a PCS transmitter 318. Rate adaptation device 300 may further comprise an egress path having a PCS receiver 330, a FIFO memory module 332, an idle inserter module 334, a pause inserter module 336, and a PCS transmitter 338.

In one embodiment, the size of the FIFO 316, 332 is a function of the difference in the respective port rates of the input ports ($f_1$, $f_2$), the maximum transmission unit (MTU) size, and a margin (M). In one embodiment, the size of the FIFO may be estimated as follows:

$$\text{FIFO} = \text{MTU}(f_1 - f_2)/f_1 + M$$

In one embodiment, the FIFO 316 may provide a control signal as feedback to the idle remover 314 and FIFO 334 may provide a control signal to idle inserter 334.

Figure 4:
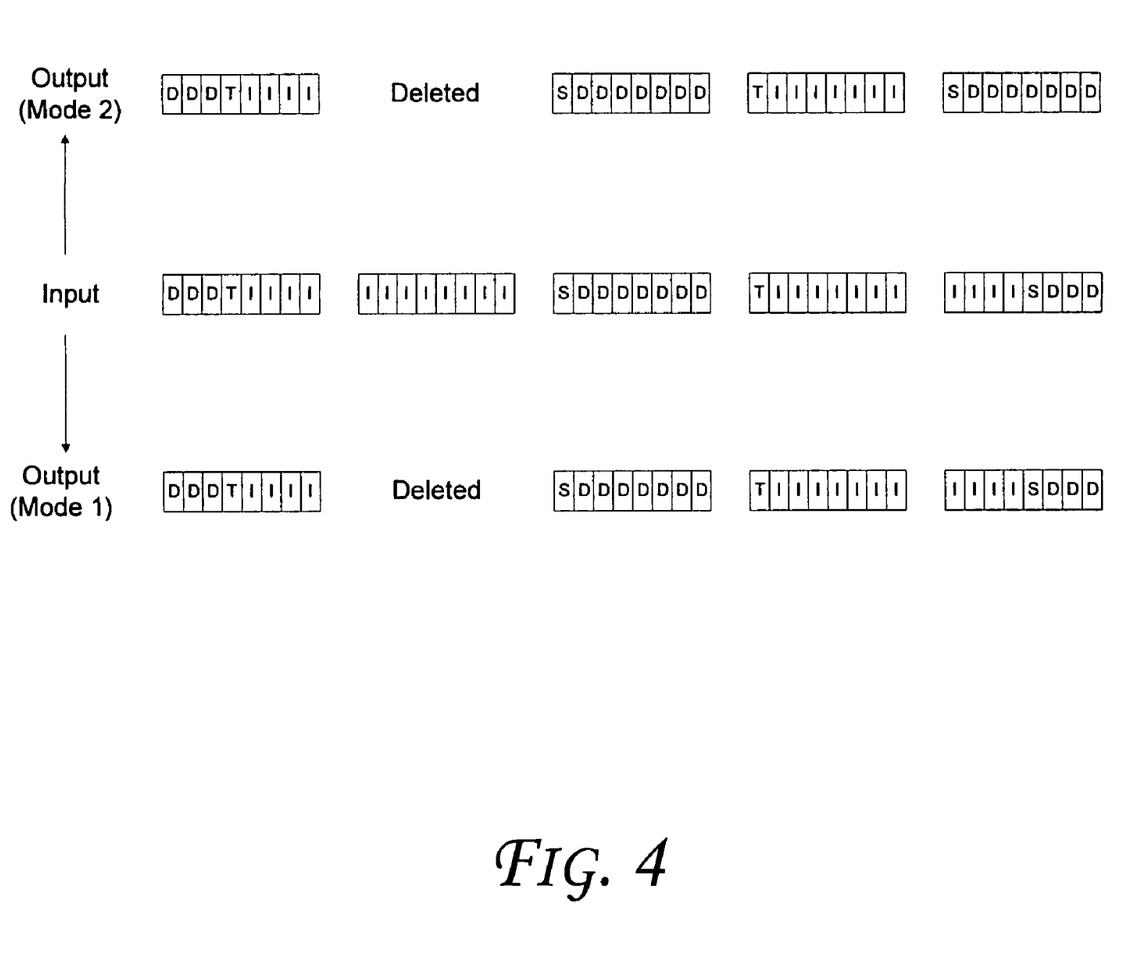
FIG. 4 is a schematic illustration of data streams in accordance with embodiments.

Various embodiments of rate adaptation operations are explained with reference to FIGS. 4-7. In embodiments, the rate adaptation device 300 operates on unscrambled 66-bit PCS blocks, as defined in IEEE 802.3ae-2002, clause 49. The rate adaptation device 300 may be operated in one of two modes. Referring to FIG. 4, in a first mode, the ingress path of rate adaptation device 300 may operate to remove groups of eight contiguous idle symbols from a PCS block. In a second mode, the ingress path of rate adaptation device 300 operates to remove groups of four contiguous idle symbols from a PCS block, except when the four continuous blocks are preceded by a termination symbol.

Figure 5:
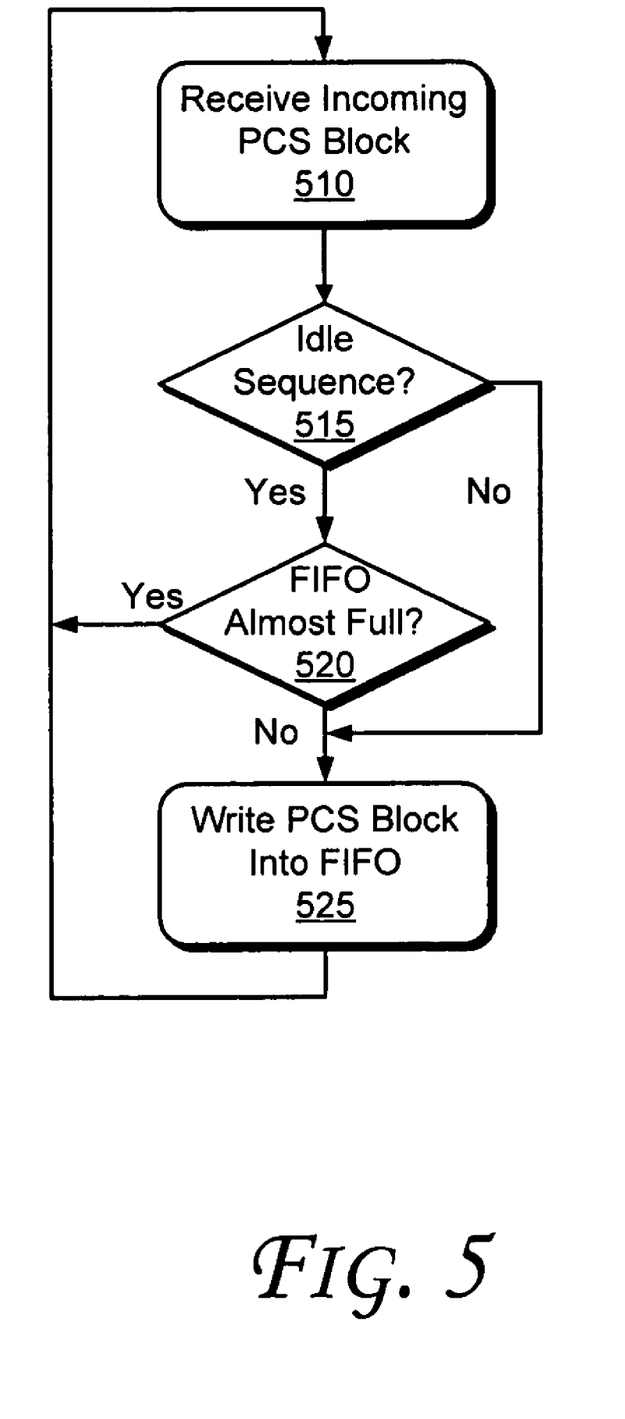
FIGS. 5-7 are flowcharts illustrating operations in various embodiments for reading data frames from a memory.

FIG. 5 illustrates operations for rate adaptation when the rate adaptation device 300 is operating in the first mode discussed with reference to FIG. 4. Referring to FIG. 5, at operation 510 an incoming PCS block is received in the PCS receiver 312, which forwards the received block to the idle remover 314. If, at operation 515, the PCS block is not a sequence of eight idle symbols, then the idle remover 314 passes the PCS block to the FIFO buffer 316 (operation 525). By contrast, if at operation 515 the PCS block received is a sequence of eight idle symbols, then the idle remover 314 determines, at operation 520, whether the FIFO buffer 316 is almost full. In one embodiment, the FIFO buffer may be considered almost full if the FIFO buffer is filled to, e.g., fifty percent of capacity. If the FIFO buffer 316 is not almost full, then the PCS block is written to the FIFO buffer. By contrast, if the FIFO buffer 316 is almost full, then control passes back to operation 510, i.e., the block of idle sequences is not written to the FIFO buffer. The operations of FIG. 5 enable the idle remover 314 to delete idle PCS blocks from the data stream.

Figure 6:
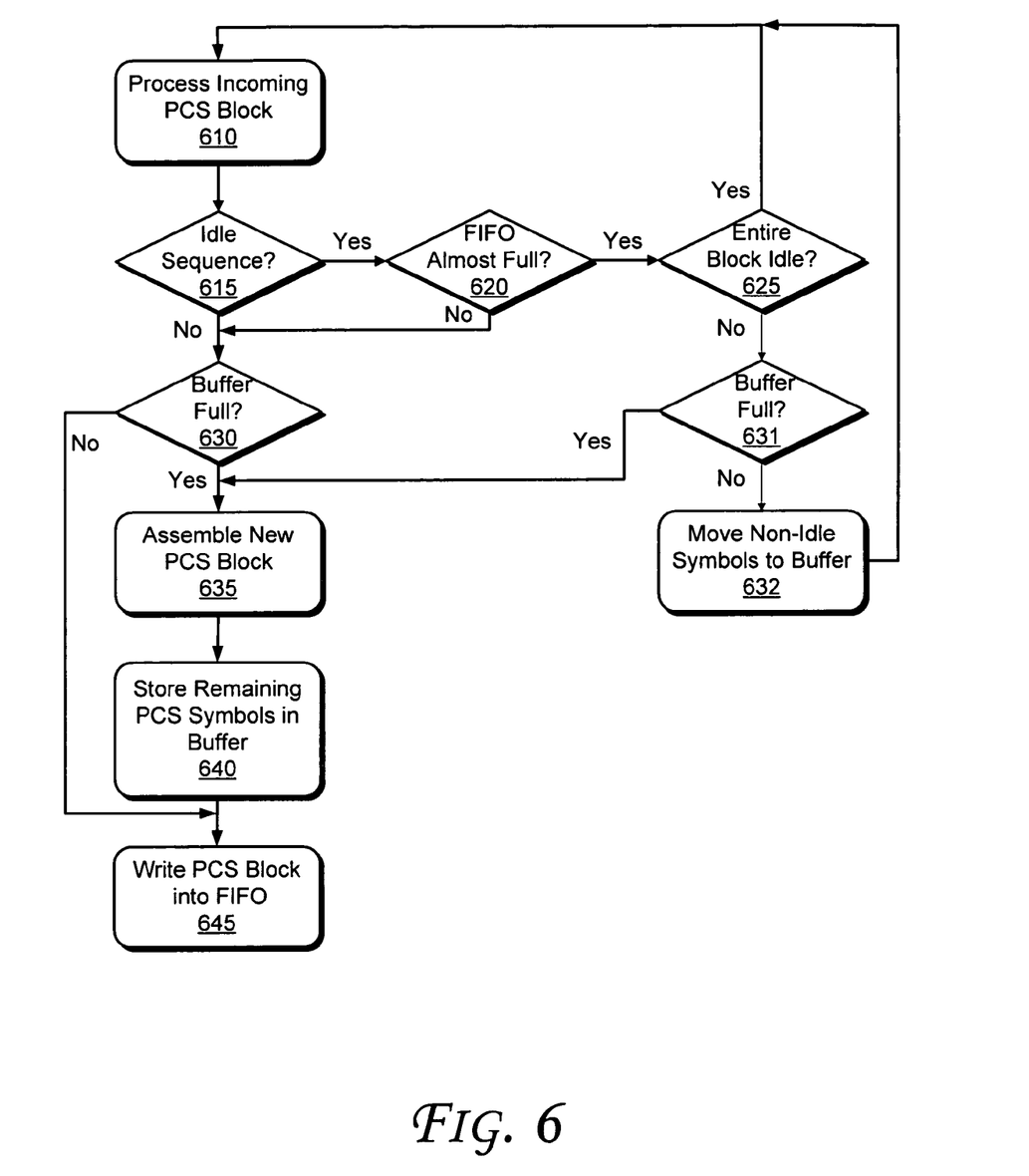

FIG. 6 illustrates operations for rate adaptation when the rate adaptation device 300 is operating in the second mode discussed with reference to FIG. 4, which detects groups of four idle symbols. Referring to FIG. 6, at operation 610 an incoming PCS block is received in the PCS receiver 312, which forwards the received block to the idle remover 314. If, at operation 615, the PCS block includes a removable sequence of four idle symbols, then the idle remover 314 determines, at operation 620, whether the FIFO buffer 316 is almost full. In one embodiment, the FIFO buffer may be considered almost full if the FIFO buffer is filled to fifty percent of capacity. If the FIFO buffer 316 is almost full, then control passes to operation 625 and the idle remover 314 determines whether the entire PCS block is idle symbols. If at operation 625 the entire block is idle symbols, then control passes back to operation 610, i.e., the block of idle sequences is not written to the FIFO buffer. By contrast, if at operation 625 the entire block is not idle, then control passes to 631. At 631 it is determined if buffer 315 contains data. If so, a new PCS block is assembled at operation 635 from non-idle symbols of the current PCS block and the content of buffer 315. If buffer 315 is empty, then the respective non-idle symbols are moved to buffer 315 and state 610 is reached without writing FIFO 645.

Referring back to operations 615 and 620, if the incoming PCS block lacks a sequence of four consecutive idle symbols (operation 615) or if the FIFO buffer is not almost full (operation 620), then control passes to operation 630. At operation 630 the idle remover 314 determines whether the buffer 315 is full. If, at operation 630 the buffer is not full, then control passes to operation 645 and the entire PCS block is written into the FIFO buffer 316. By contrast, if at operation 630 the buffer is full, then control passes to operation 635 and the idle remover 314 assembles a new PCS block from the PCS block symbols in the buffer 315 and a portion of the symbols in the received PCS block. At operation 640 the remaining symbols from the received PCS block are stored in the buffer 315 and at operation 645 the idle remover 314 writes the PCS block into the FIFO buffer 316.

In an embodiment, the contents of the FIFO buffer 316 may be periodically written to the PCS transmitter 318, which transmits the PCS blocks via a suitable interface typically to a higher-layer protocol, e.g., OTN/SDH/SONET. The PCS blocks may be forwarded to SONET/SDH framer 240, which assembles data packets into frames suitable for transmission on a SONET/SDH network.

Figure 7:
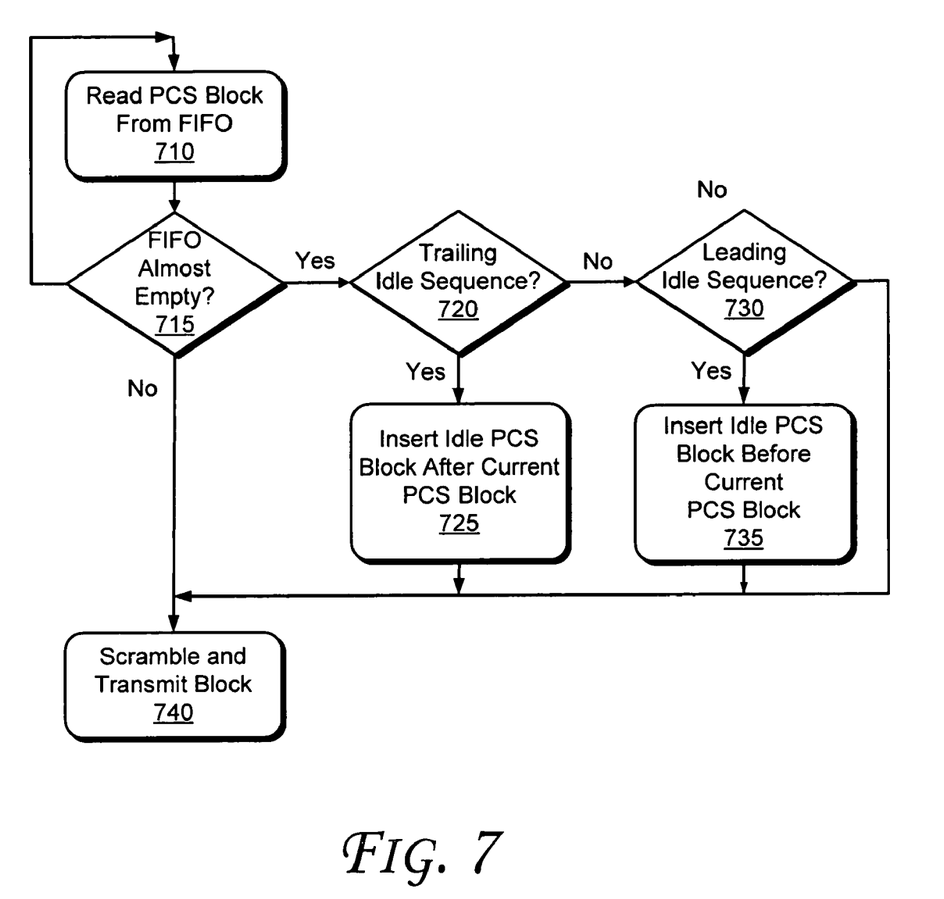

FIG. 7 illustrates operations for rate adaptation when the rate adaptation device 300 inserts idle blocks. In one embodiment, the operations depicted in FIG. 7 may be implemented by the idle inserter 334 in the egress path of the adaptation device 300. PCS blocks received in the PCS receiver 330 may be buffered in FIFO 332. Referring to FIG. 7, at operation 710 the idle inserter 334 reads a PCS block from the FIFO 332. If, at operation 715, the FIFO 332 is not almost empty, then control passes to operation 740 and the PCS block may be forwarded to PCS transmitter 338, which transmits the PCS block. In one embodiment, the FIFO 332 may be considered almost empty if the available space in FIFO 332 is smaller than the amount established by the formula set forth above.

By contrast, if at operation 715 the FIFO 332 is almost empty, then control passes to operation 720 and the idle inserter 334 determines whether the received PCS block includes a trailing idle sequence. If the received PCS block includes a trailing idle sequence, then control passes to operation 725 and the idle inserter inserts an idle PCS block after the current PCS block. Control then passes to operation 740 and the PCS block may be forwarded to PCS transmitter 338, which transmits the PCS block.

By contrast, if at operation 720 the received PCS block does not include a trailing idle sequence, then control passes to operation 730 and the idle inserter 334 determines whether the received PCS block includes a leading idle sequence, i.e., whether the first four symbols of the block are idle symbols. If the received PCS block includes a leading idle sequence, then control passes to operation 735 and the idle inserter inserts an idle PCS before after the current PCS block. Control then passes to operation 740 and the PCS block may be forwarded to PCS transmitter 338, which transmits the PCS block.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A rate adaptation device, comprising:
   one or more input/output (I/O) ports coupled to a first network operating at a first data transmission rate;
   a first physical coding sublayer (PCS) receiver to receive a stream of PCS blocks from the first network;
   a first-in-first-out (FIFO) memory;
   an idle symbol remover in the communication path between the PCS receiver and the FIFO memory and comprising a memory buffer separate from the FIFO memory to selectively remove, in response to a control signal from the FIFO memory, a sequence of idle symbols from a first PCS block and combine one or more non-idle PCS symbols from the first PCS block in the buffer with one or more non-idle PCS symbols selectively removed from a second PCS block to form a third PCS block; and
   a PCS transmitter coupled to the FIFO memory module to transmit the third PCS block to a second network operating at a second data transmission rate,
   wherein the control signal indicates whether the FIFO memory is almost full.

2. The rate adaptation device of claim 1, wherein the idle symbol remover selectively removes a sequence of four consecutive idle symbols from a PCS block, except when the sequency of four consecutive symbols are preceded by a termination symbol.

3. The rate adaptation device of claim 1, further comprising a network processor coupled to the PCS transmitter.

4. The rate adaptation device of claim 1, further comprising:
   a second PCS receiver to receive a stream of PCS blocks from the second network; and
   an idle block inserter to insert one or more idle PCS symbols into a data block.

5. The rate adaptation device of claim 1, further comprising a pause request frame generator to insert a pause request frame into the stream of PCS blocks.

6. A computer based method to implement rate adaptation in a packet switching device, comprising:
   receiving, in a physical coding sublayer (PCS) receiver in the packet switching device, a first stream of physical coding sublayer (PCS) blocks;
   generating, in a first-in-first-out (FIFO) memory, a control signal which indicates whether the FIFO memory is almost full;
   detecting, in an ideal symbol remover in the communication path between the PCS receiver and the FIFO memory a predetermined sequence of idle symbols in a first PCS block; and
   selectively removing, in response to the control signal from the FIFO memory, the predetermined sequence of idle symbols from the first PCS block; and
   storing the predetermined sequence of idle symbols in a memory buffer separate from the FIFO memory.

7. The method of claim 6, wherein removing the sequence of idle symbols from the first PCS block comprises storing one or more non-idle PCS symbols in a buffer.

8. The method of claim 7, further comprising combining the one or more non-idle PCS symbols in the buffer with one or more non-idle PCS symbols from a second PCS block.

9. The method of claim 8, further comprising:
   assembling a third PCS block from the symbols from the first PCS block and the second PCS block;
   forwarding the third PCS block to a first-in-first-out (FIFO) buffer; and
   transmitting the third PCS block.

10. The method of claim 6, wherein detecting a predetermined sequence of idle symbols in a first PCS block comprises detecting a group of four consecutive idle symbols which are not preceded by a termination symbol.

11. The method of claim 6, wherein:
   detecting a predetermined sequence of idle symbols in a first PCS block comprises detecting a group of eight consecutive idle symbols; and
   removing the predetermined sequence of idle symbols from the first PCS block comprises deleting the first PCS block.

12. The method of claim 6, further comprising:
   receiving a second stream of physical coding sublayer (PCS) blocks;
   detecting a first sequence of idle symbols in a PCS block; and
   inserting a second sequence of idle symbols into the PCS block.

13. The method of claim 12, further comprising transmitting the third PCS block.

14. The method of claim 12, wherein detecting a sequence of idle symbols in a first PCS block comprises detecting a group of four consecutive idle symbols.

15. A data packet transmitting apparatus, comprising:
   a signal source to generate a 10 gigabyte Ethernet signal;
   a transport network;
   a signal adapter in the communication path between the signal source and the transport network to adapt the 10 gigabyte Ethernet signal into a payload container suitable for the transport network; and
   a rate adaptation device coupled to the signal adapter and comprising:
      one or more input/output (I/O) ports;
      a first physical coding sublayer (PCS) receiver to receive a stream of PCS blocks from the one or more input/output ports;
      a first-in-first-out (FIFO) memory;
      an idle symbol remover in the communication path between the PCS receiver and the FIFO memory and comprising a memory buffer separate from the FIFO memory to selectively remove, in response to a control signal from the FIFO memory, a sequence of idle symbols from a first PCS block and combine one or more non-idle PCS symbols from the first PCS block in the buffer with one or more non-idle PCS symbols selectively removed from a second PCS block to form a third PCS block; and
      a PCS transmitter coupled to the FIFO memory module to transmit the third PCS block to a second network operating at a second data transmission rate,
      wherein the control signal indicates whether the FIFO memory is almost full.

16. The data packet transmitting apparatus of claim 15, further comprising:
   a mapping module to map the output of the signal adapter into a transport structure suitable for transmission across the transport network; and
   an add/drop multiplexer to multiplex the transport structure onto the transport network.

17. The data packet transmitting apparatus of claim 15, wherein the idle symbol remover selectively removes a sequence of four consecutive idle symbols from a PCS block, except when the sequence of four consecutive symbols are preceded by a termination symbol.

18. The data packet transmitting apparatus of claim 15, further comprising:
   a second PCS receiver to receive a stream of PCS blocks from the second network; and
   an idle block inserter to insert one or more idle PCS symbols into a data block.

19. The data packet transmitting apparatus of claim 15, further comprising a pause request frame generator to insert a pause request frame into the stream of PCS blocks.

* * * * *